(12) United States Patent
Holcombe et al.

(10) Patent No.: US 6,671,696 B1
(45) Date of Patent: Dec. 30, 2003

(54) INFORMATIONAL OBJECT AUTHORING AND DISTRIBUTION SYSTEM

(75) Inventors: Steven L. Holcombe, Stillwater, OK (US); Marvin L. Stone, Stillwater, OK (US)

(73) Assignee: Pardalis Software, Inc., Stillwater, OK (US)

( * ) Notice: Subject to any disclaimer, the term of this patent is extended or adjusted under 35 U.S.C. 154(b) by 216 days.

(21) Appl. No.: 09/934,951

(22) Filed: Aug. 20, 2001

(51) Int. Cl.[7] .................................................. G06F 17/30
(52) U.S. Cl. .................................................. 707/103 R
(58) Field of Search ................................ 707/101, 102, 707/103 R, 103; 709/315, 328; 717/116

(56) References Cited

U.S. PATENT DOCUMENTS

| | | | |
|---|---|---|---|
| 5,511,197 A | * 4/1996 | Hill et al. ..................... | 709/328 |
| 5,724,588 A | * 3/1998 | Hill et al. ..................... | 709/328 |
| 6,167,394 A | 12/2000 | Leung et al. | |
| 6,341,287 B1 | 1/2002 | Sziklai et al. | |
| 6,397,115 B1 | 5/2002 | Basden | |
| 6,438,560 B1 | * 8/2002 | Loen ....................... | 707/103 R |
| 6,493,719 B1 | * 12/2002 | Booth et al. ............ | 707/103 X |

* cited by examiner

Primary Examiner—Diane D. Mizrahi
Assistant Examiner—Apu M Mofiz
(74) Attorney, Agent, or Firm—Patton Boggs, LLP

(57) ABSTRACT

The informational object authoring and distribution system functions to provide Value-Added Material Safety Data Sheets via the use of a centralized repository of uniquely identified, immutable Material Safety Data Sheets. This system automates the authoring, maintenance and distribution of the Value-Added Material Safety Data Sheets by using an Internet-based paradigm and a centralized repository of uniquely-identified, immutable data elements. The informational object authoring and distribution system provides a set of software modules that the manufacturers can use to author, maintain and distribute Material Safety Data Sheets and their customers, as members of the system of Value-Added Material Safety Data Sheets, can use to retrieve, maintain and distribute the Material Safety Data Sheets. The system's interconnectivity allows for the use of an Internet-based paradigm for the purchase and sale among members of the system of Value-Added Material Safety Data Sheets as commodities, and for reducing the burden costs among members of compliance with government regulations. In addition, the informational object authoring and distribution system can provide value-added services by providing advertising of services and products facilitating the interconnection of the manufacturers and manufacturer's customers with other members of the system of Value-Added Material Safety Data Sheets who are vendors, and who provide services and products related to the information and instructions contained in Value-Added Material Safety Data Sheets.

33 Claims, 15 Drawing Sheets

INFORMATIONAL OBJECT AUTHORING AND DISTRIBUTION SYSTEM

FIELD OF THE INVENTION

This invention relates to automated document authoring and distribution systems and to a system that enables subscribers to efficiently author, maintain and distribute informational objects that contain immutable content, such as Material Safety Data Sheets that are used in the chemical manufacturing industry.

Problem

It is a problem in the field of information distribution to author, maintain and distribute informational objects that contain immutable data. An example of an informational object is the chemical manufacturing industry's Material Safety Data Sheet that is generated in compliance with appropriate government regulations. Presently this process is paper-based and entails a significant cost, in the case of Material Safety Data Sheets, for both manufacturers of chemicals as well as distributors/users of chemicals.

A Material Safety Data Sheet consists of a collection of information that relates to a specific chemical product. The information typically identifies the manufacturer of the chemical, its commercial name and other identification information, various physical and health characteristics, instructions related to worker health and safety in the storage, transportation, handling and disposal of the chemical, and instructions and medical information related to an emergency response in the case of a chemical release or injury. The format and content of the Material Safety Data Sheets are mandated in a general and inconsistent manner by various regulatory agencies. The Material Safety Data Sheets must be issued and updated by each chemical manufacturer for each chemical that they manufacture.

These documents are presently distributed in a paper-based format (including scanned images) and require extensive resources to maintain. In addition, there is significant redundancy of effort, since each manufacturer must generate and maintain Material Safety Data Sheets for each product that they manufacture, even though the equivalent or identical product may be manufactured by another chemical manufacturer. The chemical manufacturers are obligated under regulations of the Occupational Safety and Health Administration to distribute paper-based Material Safety Data Sheets free of charge to all of their customers, who must receive the Material Safety Data Sheets for each chemical purchased and must make the corresponding Material Safety Data Sheets available to their workers free of charge. Furthermore, the manufacturers must author, maintain and distribute the paper-based Material Safety Data Sheets at their own burden costs while their customers must receive and maintain the same Material Safety Data Sheets at their own burden costs. The burden costs involved in executing this process is significant, both to the manufacturers and their customers. There is presently no central registry of Material Safety Data Sheets, even though there are in excess of 1,000,000 chemicals for which a corresponding Material Safety Data Sheet is required.

Thus, the need to automate the authoring of informational objects, the rendering of such informational objects into an immutable form, and the distribution of the immutable content informational objects in compliance with certain defined criteria represents a problem. The chemical manufacturing industry is illustrative of the nature of this problem and the example of Material Safety Data Sheets is used for the purpose of illustrating the operation of the present informational object authoring and distribution system and is not intended to limit the scope of the described system.

Solution

The above-described problems are solved and a technical advance achieved by the present informational object authoring and distribution system functions to provide Value-Added Material Safety Data Sheets via the use of a centralized repository of uniquely identified, immutable Material Safety Data Sheets. This system automates the authoring, maintenance and distribution of the Value-Added Material Safety Data Sheets by using an Internet-based paradigm and a centralized repository of uniquely-identified, immutable data elements. The informational object authoring and distribution system provides a set of software modules that the manufacturers can use to author, maintain and distribute Material Safety Data Sheets and their customers can use to retrieve, maintain and distribute the Material Safety Data Sheets. The system's interconnectivity allows for the use of an Internet-based paradigm for the purchase and sale among members of the system of Value-Added Material Safety Data Sheets as commodities, and for reducing the burden costs among members of compliance with government regulations. In addition, the informational object authoring and distribution system can provide value-added services by provides advertising of services and products facilitating the interconnection of the manufacturers and manufacturer's customers with other members who are vendors, and who provide services and products related to the information and instructions contained in Value-Added Material Safety Data Sheets.

The system uses an object-oriented framework for communication of the Material Safety Data Sheets among the manufacturers, manufacturer's customers and workers. The Value-Added Material Safety Data Sheets are not document files or database files, but instead are objects that contain sequences of instructions and information on which the instructions operate. A particular Value-Added Material Safety Data Sheet contains pointers that identify a plurality of immutable "building blocks" of information that, when collected, comprise the Material Safety Data Sheet. Each building block is comprised of a data element and a unique identifier that exclusively identifies that data element.

Since the data elements are fixed, they do not require updating and a new version of a Material Safety Data Sheet for a particular chemical simply includes a unique identifier that points to a replacement data element, while the original data element is maintained in the central database. Thus, a data element is not expunged from the database but is simply supplanted by a later version of the data element. Thus, for each venue, the contents of the Material Safety Data Sheet remain immutable, even though the format can vary. In addition, the creation of a new Material Safety Data Sheet can utilize existing data elements from the central database if the content of the associated portion of the Material Safety Data Sheet is identical to this data element. Thus, authoring new Material Safety Data Sheets can benefit from a repository of standardized data elements, with only the unique segments of the new Material Safety Data Sheet requiring the creation of a new data element. Translations of the data elements into other languages is simplified since the system mandates the use of standardized phrases and other associated data in the creation of the various data elements. In addition, the data elements can be transported on a read only basis from a Material Safety Data Sheet to another database by simply filtering the data retrieved by the Material Safety Data Sheet object. In this manner the integrity of the informational object authoring and distribution system is maintained but the data contained therein is available to manufacturers and other members of the system for related purposes.

As the Material Safety Data Sheets are authored, maintained and distributed, the relevant data regarding these processes and the entities participating in these processes are available, with appropriate authorization of the parties, to use in identifying products and services that can be beneficial to these entities participating in these processes. In particular, the context of the Material Safety Data Sheet authoring, maintenance or distribution can be used to identify products and services that are pertinent to the chemical identified in the Material Safety Data Sheet in terms of context sensitive, real-time advertising access to members who access the Material Safety Data Sheets.

DETAILED DESCRIPTION

For the purpose of this description, the following terms are defined:

Member comprises an entity, either a business or an individual, who is authorized to access and utilize the capabilities of the present informational object authoring and distribution system.

Terminal Device comprises a personal computer, hand held computing device, cellular communication device, wireless computer device, or other data interface device. Typically, the terminal device used is a full function communication device of the type that includes: WAP enabled cellular telephones, personal digital assistants, Palm Pilots, personal computers, and the like, or some other specialized communication device.

Data Element comprises a set of data that is uniquely identified and stored in immutable form for use by the present informational object authoring and distribution system.

Informational Object comprises a set of information that is uniquely identified and stored in immutable form for use by the present informational object authoring and distribution system. The set of information contained in an informational object comprises a plurality of individual data elements, each of which is also immutable in content.

Material Safety Data Sheet comprises the collection of hazard communication information required by the Occupational Safety and Health Administration (OSHA) that is designed to insure that all chemical products produced or imported are evaluated for hazardousness, and that information concerning their hazardousness is transmitted to workers. Because the uses of Material Safety Data Sheets have been expanded upon by domestic and international government agencies other than OSHA, Material Safety Data Sheets are additionally authored to include information relevant to government agencies concerned with environmental, transportation, waste management, community right-to-know and emergency planning issues.

Terminal Equipment and Communications Environment

Figure 1A:
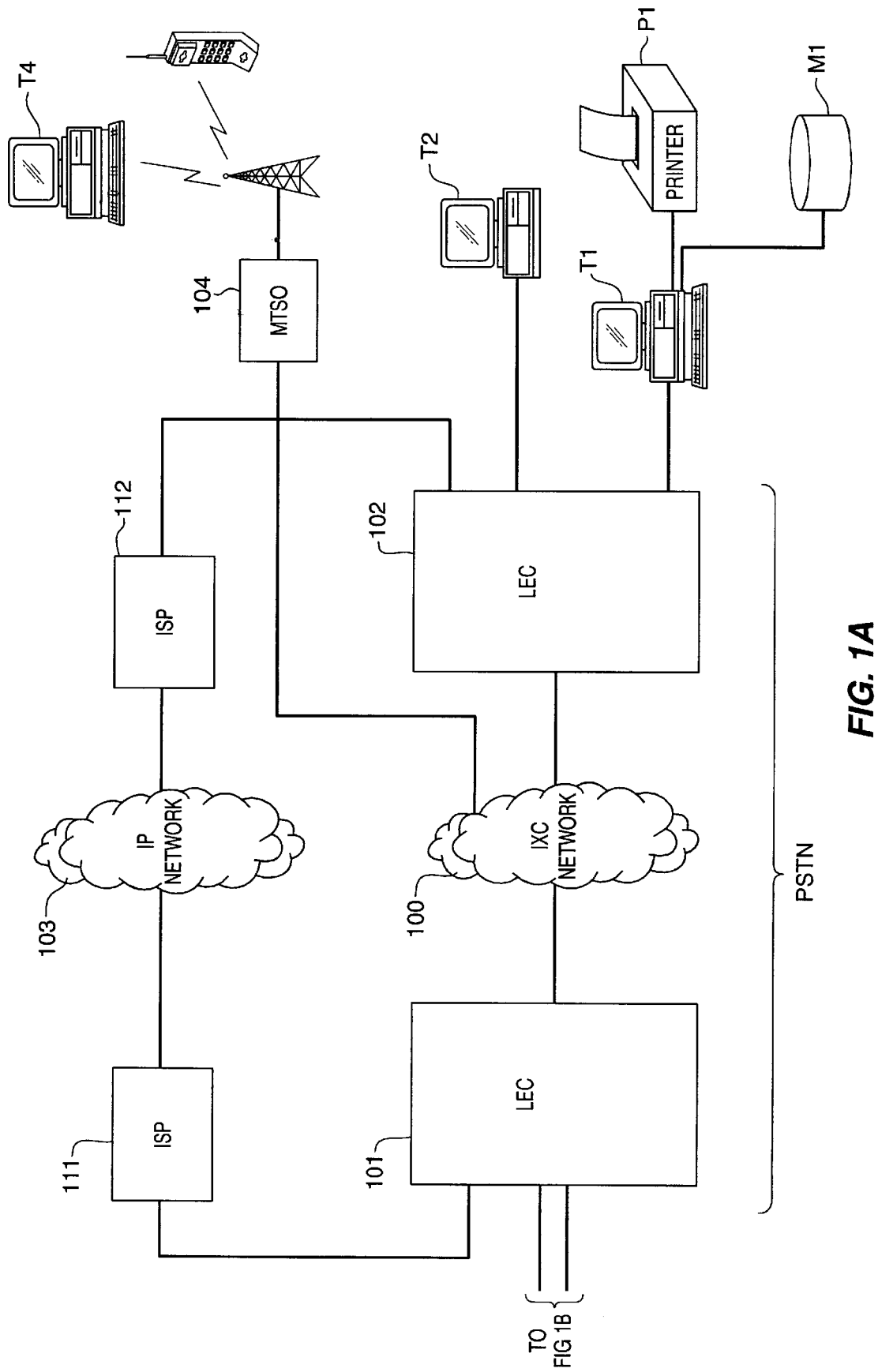
FIGS. 1A–1B illustrate in block diagram form the overall architecture of the present informational object authoring and distribution system and an environment in which it is operational.
Figure 1B:
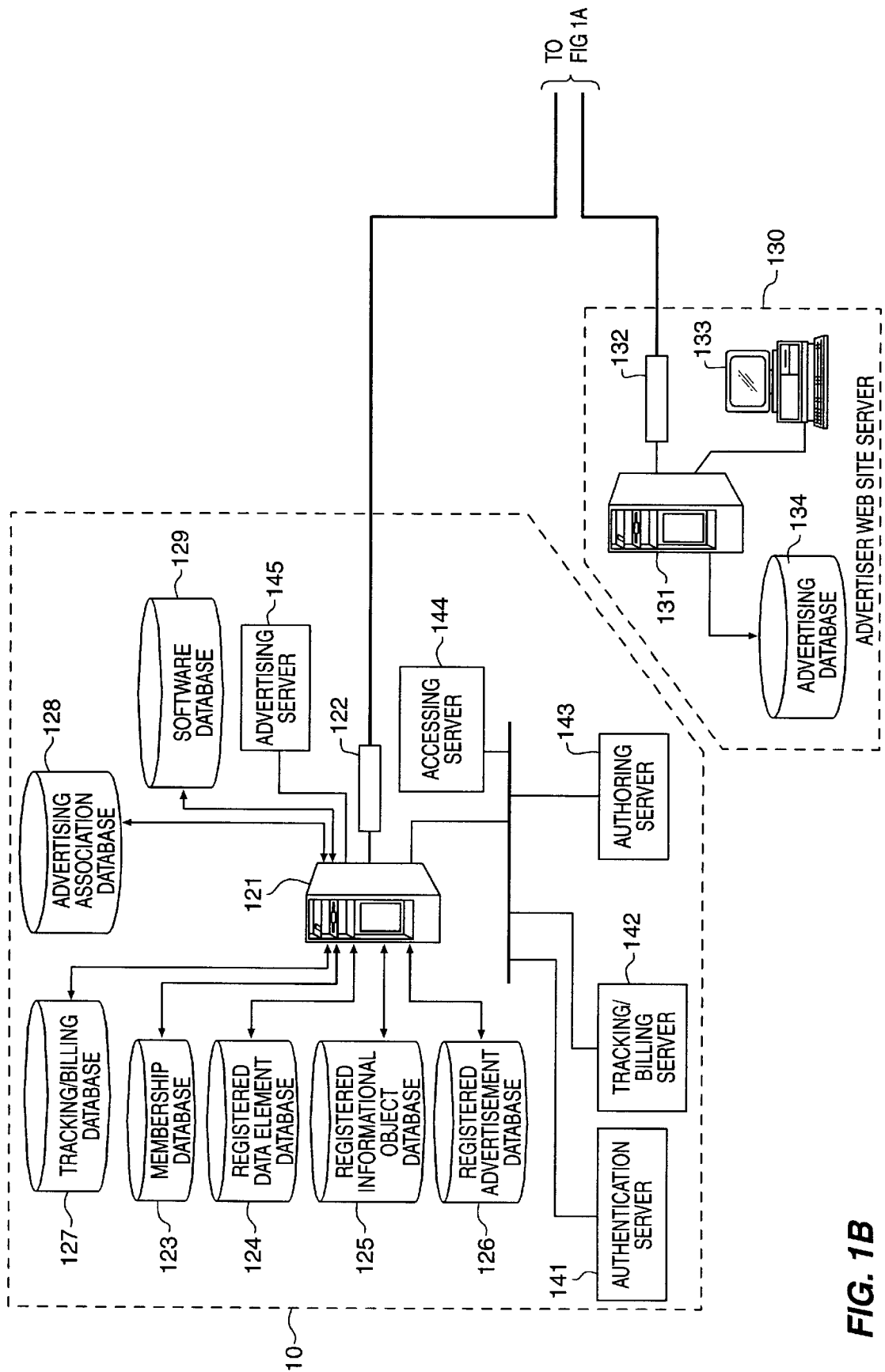

FIGS. 1A & 1B illustrate in block diagram form the overall architecture of the informational object authoring and distribution system 10 and a typical environment in which it is operational. The members are typically equipped with one or more of a personal computer T1, T2, hand held computing device (not shown), cellular communication device T3, wireless computer device T4, or other data interface device, collectively termed "terminal equipment" herein. The data communication connection between the member's terminal equipment T1 and the present informational object authoring and distribution system 10 can be via the Internet 103, using the well known personal computer modem and Internet browser technology available at the member's terminal equipment T1. The member's terminal equipment is generally served by the Public Switched Telephone Network (PSTN) which consists of a plurality of Local Exchange Systems 101, 102 interconnected via an Inter-Exchange Carrier Network 100. The physical connection that supports this data communication connection is typically effected from member's terminal equipment T1 through the Local Exchange System 102 of the Public Switched Telephone Network (PSTN) via a data communication medium (such as the Internet), termed IP Network 103 herein, to an Internet Service Provider 112 which is also connected thereto. The Internet 103 is also connected to a Local Exchange System 101 via Internet Service Provider 111 that serves the gateway 122 of the informational object authoring and distribution system 10. Alternatively, the member's terminal equipment, in the case of cellular communication device T3, or wireless computer device T4, is connected via the Mobile Telecommunications Switching Office (MTSO) 104 to the Public Switched Telephone Network (PSTN).

The informational object authoring and distribution system 10 is connected to at least one data communication medium 103 (such as the Internet) to thereby enable members to obtain data communication connections with the informational object authoring and distribution system 10, as described in more detail below.

In addition, other computer systems, such as Advertiser WEB Site Server 130 can be served by the informational object authoring and distribution system 10. The advertiser WEB site server system typically comprises a firewall gateway 132, a server 131, terminal device(s) 133 and a mass storage device represented here as an advertising database 134. Such a system can be used to create advertisement materials for use in conjunction with the informational object authoring and distribution system 10 and to be provided to members who are linked to the advertiser WEB site system by the operation of the informational object authoring and distribution system 10 as described below.

The resources illustrated herein are selected for the purpose of illustrating the concept of the informational object authoring and distribution system 10 and are not intended to limit the applicability of this concept to other network implementations or system configurations.

Architecture of the Informational Object Authoring and Distribution System

Informational object authoring and distribution system 10 consists of a server 121 which is connected to the Internet 103 via a gateway 122 that comprises the firewall which protects the informational object authoring and distribution system 10 from unauthorized access and also implements the functionality to communicate with Internet Service Provider 111. The informational object authoring and distribution system 10 includes a plurality of databases, as described below. These databases include, but are not limited to: member database 123, registered data element database 124, registered informational object database 125, registered advertisement database 126, tracking/billing database 127, advertising association database 128, and software database 129. The databases noted herein are delimited by function for the purpose of simplifying the description of the informational object authoring and distribution system 10, but these databases can be implemented in a single physical database or a lesser or greater number of databases than is shown herein. Such selections are simply a matter of engineering choice and do not relate to the concepts disclosed herein. Similarly, a single server 121 is illustrated herein, executing a plurality of software modules: authentication server 141, tracking/billing server 142, authoring server 143, member accessing server 144, advertising server 145, but multiple servers can be used to perform this task. Thus, the informational object authoring and distribution system 10 disclosed herein represents one of many possible implementations to provide the described functionality to the designated recipients.

Informational Object and Data Elements

Figure 2:
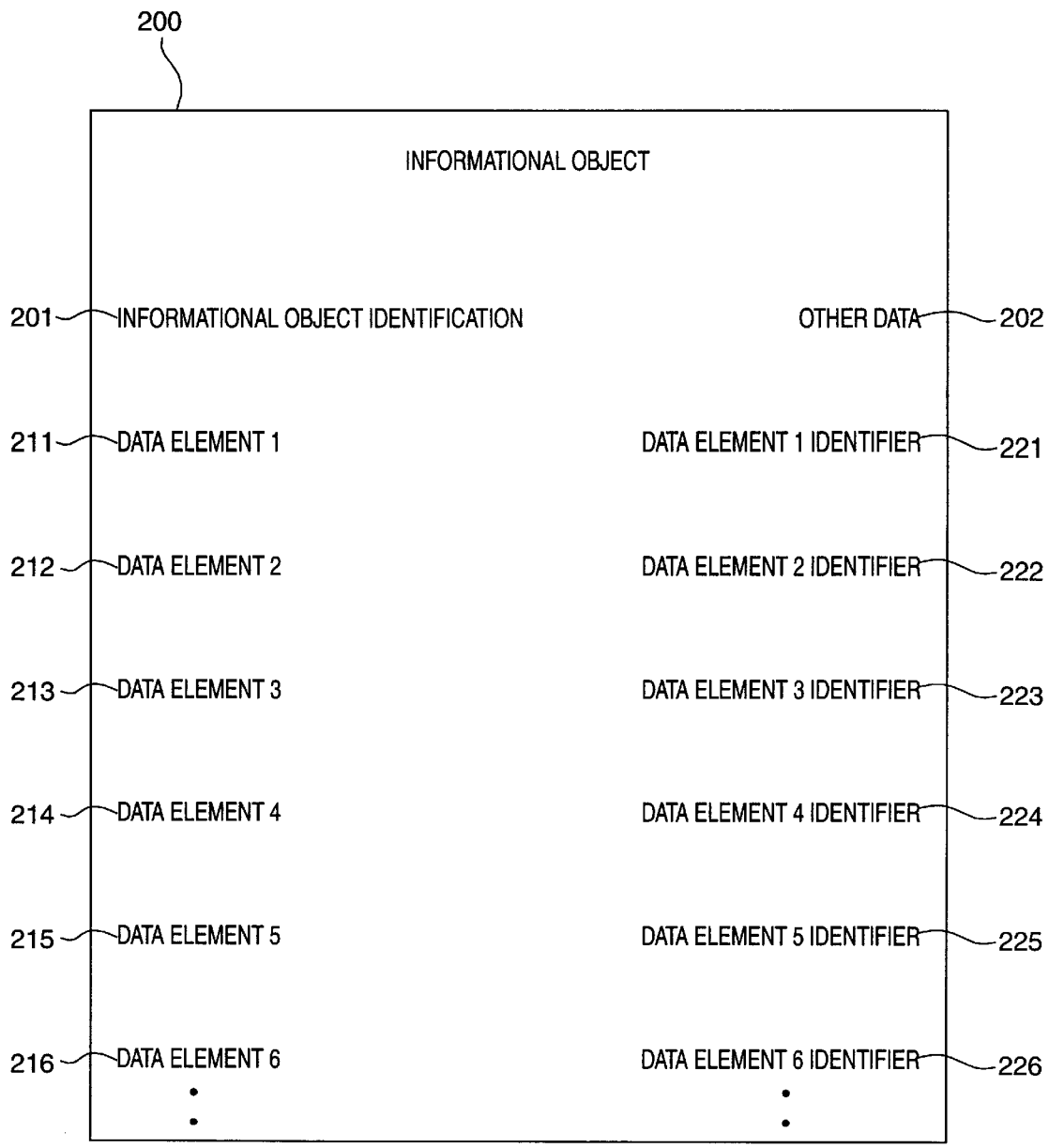
FIG. 2 illustrates a typical informational object and its contents that can be authored, distributed and maintained by the present informational object authoring and distribution system.

FIG. 2 illustrates a typical informational object and its contents that can be authored, distributed and maintained by the present informational object authoring and distribution system. In particular, the informational object 200 comprises a unique identifier 201 that designates the informational object 200, as well as a plurality of data elements 211–216, each of which itself is identified by a corresponding unique identifier 221–226. The informational object 200 can also contain other data 202, such as formatting data, permissions data, and the like as described herein. The data elements 211–216 that are associated with a particular informational object 200 are typically stored in a separate file system from the informational object 200, and are linked via the use of pointers, which comprise the data element unique identifiers 221–226.

Operation of the Informational Object Authoring and Distribution System

FIGS. 3–13 illustrate in flow diagram form the operation of the present informational object authoring and distribution system 10. The architecture of the informational object authoring and distribution system 10 described herein represents a typical implementation of the informational object authoring and distribution system 10 and its operating environment and is not intended to limit the scope of the underlying concept as defined in the enclosed claims.

Member Enrollment Process

Figure 3:
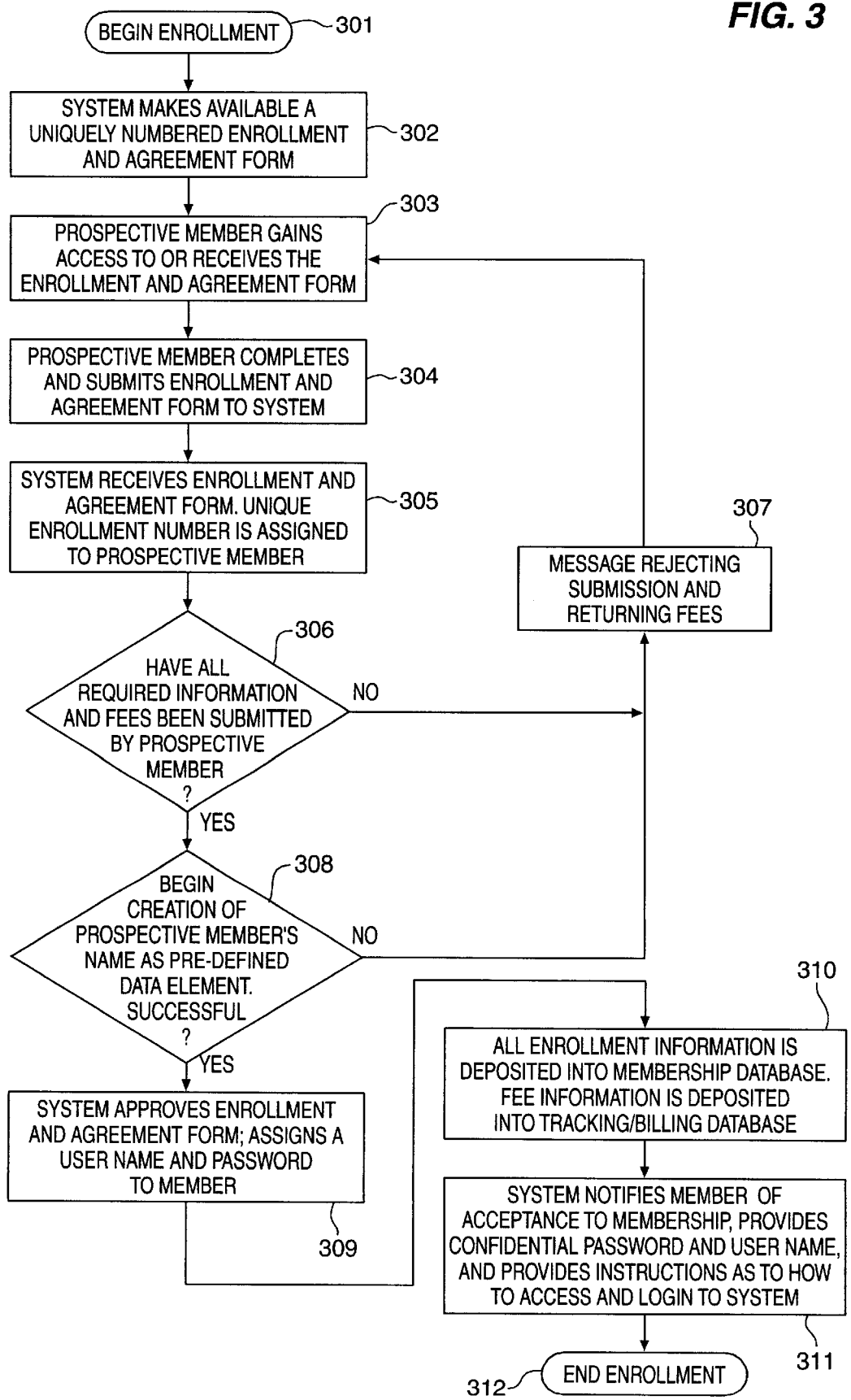
FIG. 3 illustrates in flow diagram form the operation of the member enrollment process of the present informational object authoring and distribution system.

FIG. 3 illustrates in flow diagram form the operation of the member enrollment process of the present informational object authoring and distribution system 10. At step 301, the prospective member, located at terminal device T1, initiates the enrollment process by activating their terminal device T1 to establish a communication connection to the informational object authoring and distribution system 10. Once connected thereto as described above, the informational object authoring and distribution system 10 generates a uniquely numbered enrollment and agreement form (not shown) at step 302 and transmits this form at step 303 to the prospective member at terminal device T1 via the communication connection to thereby enable the prospective member to become a subscriber to the services provided by the informational object authoring and distribution system 10. The use of the uniquely numbered enrollment and agreement form enables the informational object authoring and distribution system 10 to present specific terms and conditions of membership to the prospective member and to also track the prospective members who access the informational object authoring and distribution system 10 for enrollment purposes. This simplifies the member management process because each prospective member who accesses the informational object authoring and distribution system 10 for enrollment purposes is uniquely defined by this identifier and the remaining member information is used for billing and identification purposes. Therefore, a corporation having a plurality of sites can register each site individually without confusion, since the corporate name is not the member delimiter, the unique identification assigned to the enrollment and agreement form is.

At step 304, the prospective member provides the requested information by completing the data entry fields of the enrollment and agreement form and transmitting the completed form to the informational object authoring and distribution system 10. At step 305, the informational object authoring and distribution system 10 generates a unique enrollment number to identify and distinguish this prospective member from all other members, including members with duplicative or identical names, and checks at step 306 whether the enrollment and agreement form has been properly completed. If not, the processing branches to step 307 where an appropriate error message is returned to the prospective member indicating the improper form completion and noting that any enrollment fees will be returned if the enrollment process is terminated at this juncture, since enrollment has not been effected. If the enrollment form is correctly completed, processing advances to step 308 where, using the processes illustrated in FIG. 4, the prospective member's name and unique enrollment number are entered into the membership database 123. Again, a corporation having a plurality of sites can register each site individually without confusion since the unique identifier assigned to the enrollment and agreement form is the delimiter.

Figure 4:
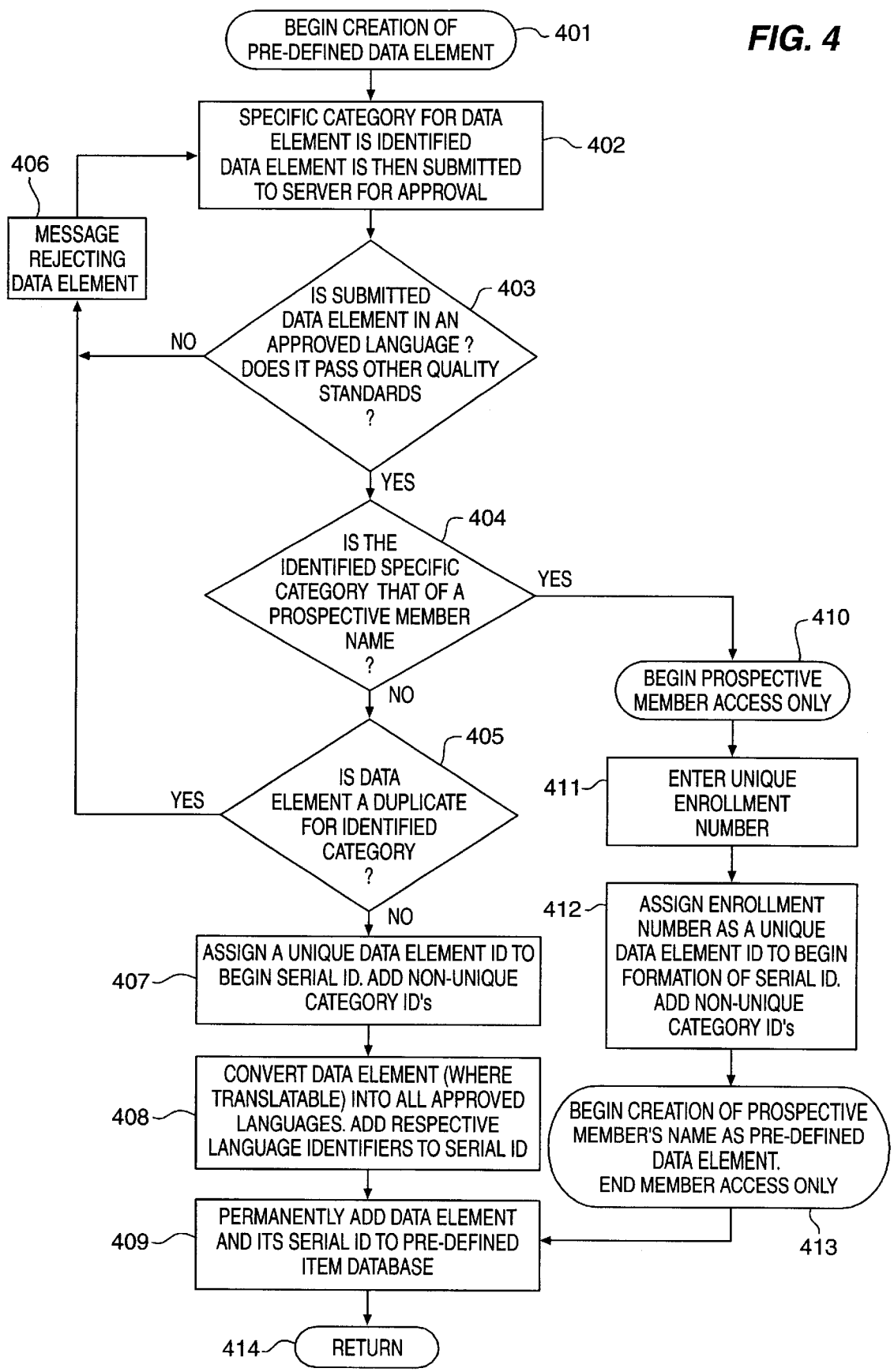
FIG. 4 illustrates in flow diagram form the operation of the data element creation process of the present informational object authoring and distribution system.

If the processes illustrated in FIG. 4 reject the prospective member's name, processing returns to step 307 where an appropriate error message is returned to the prospective member indicating the violation of a quality standard and noting that any enrollment fees will be returned if the enrollment process is terminated at this juncture, since enrollment has not been effected. If the prospective member's name is acceptable, at step 309 the informational object authoring and distribution system 10 approves the enrollment and agreement form and assigns a user name and password to this new member to enable future access of the informational object authoring and distribution system 10. At step 310, the informational object authoring and distribution system 10 deposits all of the enrollment data that was entered by the member on the enrollment and agreement form, and makes an initial entry of good standing, into the membership database 123. An invoice is generated for the tracking/billing database 127 to debit the member for the enrollment fee. Failure of a member to timely pay for invoices, debits, usage fees, membership dues and other charges associated with membership in the informational object authoring and distribution system 10 results in the striking of the entry of good standing in the membership database 123.

At step 311, the informational object authoring and distribution system 10 transmits a notification of good standing to the member of a successful enrollment and delivers the user name and password, generated at step 309, to the member. In addition, the informational object authoring and distribution system 10 downloads the software modules from the software database 129 to the member terminal device T1 that are necessary to enable the member to perform the tasks for which they have subscribed. As described below, there are a number of software modules, including but not limited to: member client software, authoring client software, advertiser client software. Each of these modules corresponds to a basic function for which the member is enabled. The enrollment process then exits at step 312.

Data Element Creation Process

FIG. 4 illustrates in flow diagram form the operation of the data element creation process of the present informational object authoring and distribution system 10. The members who are authorized to create data elements are the manufacturers who produce the products for which the informational objects are required. Thus, in the example of a Material Safety Data Sheet, the chemical manufacturer is obligated via regulatory measures to produce a Material Safety Data Sheet for each chemical manufactured. It is inappropriate to authorize others to engage in this process, since the creation of bogus data elements would corrupt the system. Therefore, when a member accesses the informational object authoring and distribution system 10 at step 502, the member's identity is checked at step 503 by the authentication server 141 against an authorized member database 123 to ensure that this member has the good standing and permissions to create an additional data element at step 512 by accessing the process illustrated in FIG. 4. Prospective members at step 308 may also access the process illustrated in FIG. 4 for the limited purpose of creating a member name as a pre-defined data element.

At step 402, a member, in the process of creating a data element at step 512, uses the authoring client software module executing on the terminal device T1 to identify and choose the category of data element and submits the proposed content for this data element. At step 402, a prospective member, in the process of creating a member's name as a pre-defined data element at step 308, is permitted by the authentication server 141 only to identify and chose a specific category for that of a member name. In either case, the category information indicates which of the various data entry fields shown in FIG. 2 is selected for placement of this particular draft data element. There are typically differences among these data entry fields and the review and certification process executed by the informational object authoring and distribution system 10 relates the proposed draft data element to all other data elements of this category stored in the system database.

Therefore, at step 403, the authoring server 143 of the informational object authoring and distribution system 10 reviews the draft data element to determine whether the language contained therein is in approved format and content, using a content parsing review process to compare the language of the draft data element with a dictionary of approved terms. In addition, where the selected category accepts image data, the image data is reviewed for content and coding where appropriate. The format is similarly checked to ensure that adequate and thorough information is provided. If the content check discerns any flaws in the draft data element, at step 406 a message is returned to the member rejecting the draft data element, with appropriate notation relating to the reason for rejection. At step 404, if the draft data element is approved, the content is reviewed to determine whether the data element content corresponds to a member name. If so, processing branches to step 410 where the member name data element creation process subroutine is activated. This subroutine creates a standard immutable data element that comprises the member name for use in creating one or more informational objects, since the member's name appears on each informational object that the author creates. At step 411, the prospective member enters the unique enrollment number assigned at step 305, and at step 412 the informational object authoring and distribution system 10 assigns the unique enrollment number as an identifier to the prospective member's name data element. At step 413, the prospective member's name and registered data element identifier are permanently added to the membership database 123, the subroutine ends and processing exits at Step 414.

At step 404, if the draft data element is not a member name, processing advances to step 405 where the draft data element is compared by the authoring server 143 with all previously registered data elements of this category to ensure that the draft data element is not duplicative of a prior data element. If duplication is determined, at step 406 a message is returned to the member rejecting the draft data element, with appropriate notation relating to the reason for rejection. Otherwise, at step 407 the authoring server 143 of the informational object authoring and distribution system 10 generates a unique registered data element identifier and assigns this to the draft data element and at step 408, the informational object authoring and distribution system 10 translates the data element into other languages and appends a language identifier to each translation of the data element. Processing then advances to step 409 where this newly created data element is permanently added to the registered data element database 124, along with its corresponding unique identifier. This process then exits at step 414.

Informational Object Creation Process

Figure 5:
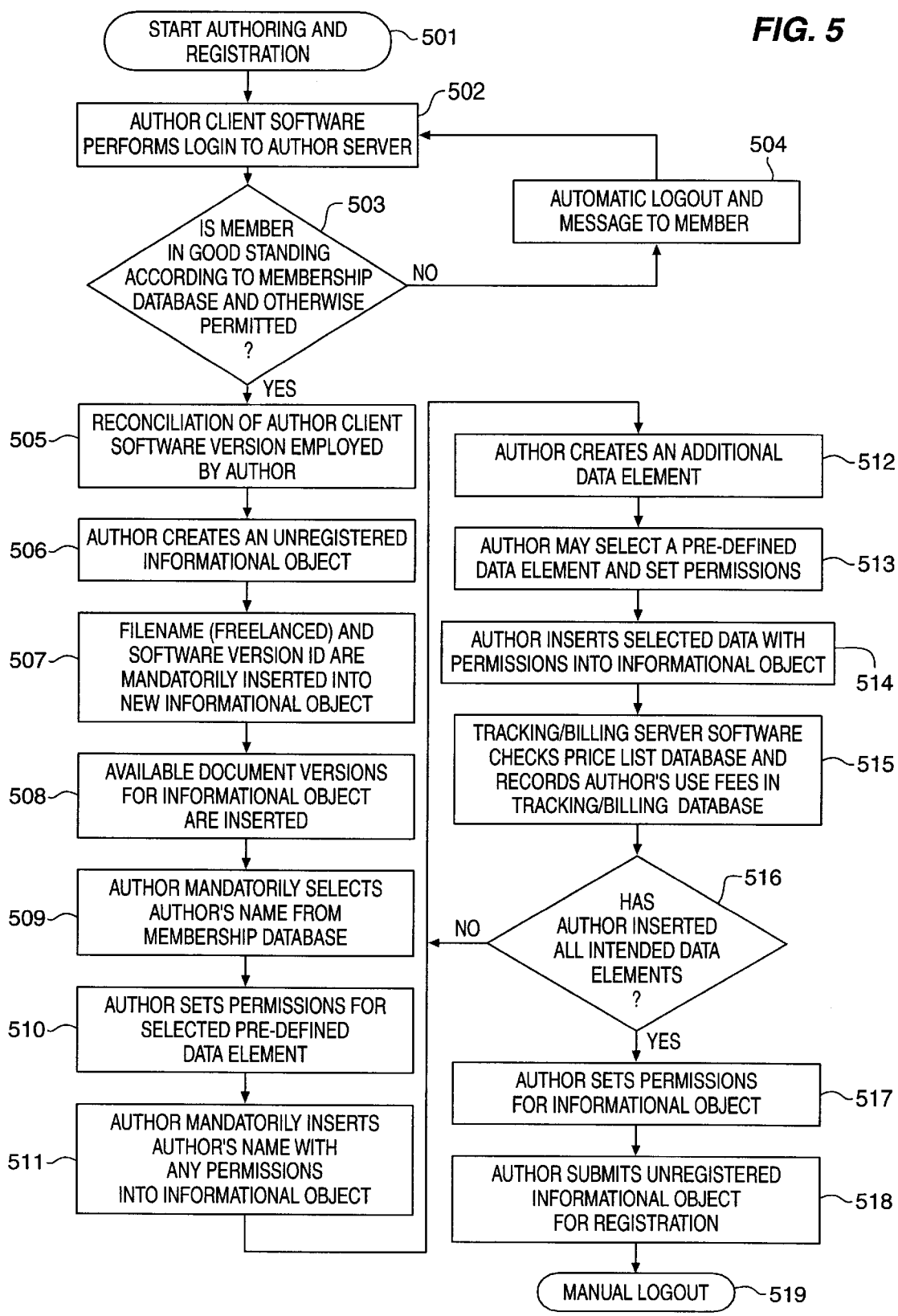
FIG. 5 illustrates in flow diagram form the operation of the informational object creation process of the present informational object authoring and distribution system.

FIG. 5 illustrates in flow diagram form the operation of the informational object creation process of the present informational object authoring and distribution system 10. The members who are authorized to create informational objects are the manufacturers who produce the products for which the informational objects are required. Thus, in the example of a Material Safety Data Sheet, the chemical manufacturer is obligated via regulatory measures to produce a Material Safety Data Sheet for each chemical manufactured. It is inappropriate to authorize others to engage in this process, since the creation of bogus informational objects would corrupt the system. Therefore, when a member accesses the informational object authoring and distribution system 10 at step 501 and executes the authoring system login process at step 502, the member's identity is checked by the authentication server 141 against an authorized membership database 123 at step 503 to ensure that this member is a member in good standing and has the authoring permissions to access the process illustrated in FIG. 5. If not, at step 504, the informational object authoring and distribution system 10 logs out.

If the member is in good standing, the informational object authoring and distribution system 10 certifies the member as an "author" for this process and advances to step 505 where the authoring client software module executing on the member's terminal device T1 is checked to identify the version of the software so that the authoring session executing of the informational object authoring and distribution system 10 can be compatible with the member's software. At step 506 the member initiates the authoring process for an informational object by creating an unregistered or draft informational object. At step 507, the authoring server 143 of the informational object authoring and distribution system 10 inserts various basic information into the unregistered informational object, such as a name freelanced by the member and an identifier of the software version used to create the informational object. The member at step 508 identifies the various formats available for use with this informational object, so various members who retrieve the informational object receive it formatted for their use, which formats are referred to as Document Versions. Thus, for the case of a Material Safety Data Sheet, there can be a Worker Version, an Industrial Hygienist Version, a Medical Professional Version, and the like. At step 509, the member must select their name by selecting a data element from the membership database 123 that corresponds to a previously stored data element whose content is the member's name. The authoring server 143 at step 510 enables the member to set permissions for access to the informational object as well as for ancillary services associated with the informational object. At step 511, these data elements selected in steps 509–510 are written into the informational object, at step 512 the member may create additional data elements using the process of FIG. 4, and at steps 513–514, the member must use previously created data elements found in the Registered Data Element Database 124 for insertion into the informational object.

At step 515, the tracking/billing server 142 of the informational object authoring and distribution system 10 calculates any fees that are due and enters this information into the tracking/billing database 127. The member determines at step 516 whether all of the necessary data elements have been inserted into the informational object. If not, processing returns to step 512 for such insertion. If all the necessary data elements have been provided, processing advances to step 517 where the member sets the permissions for this unregistered informational object and then transmits the unregistered informational object at step 518 for registration so this unregistered informational object can be processed to become a registered informational object, and the process exits at step 519.

Informational Object Registration Process

Figure 6:
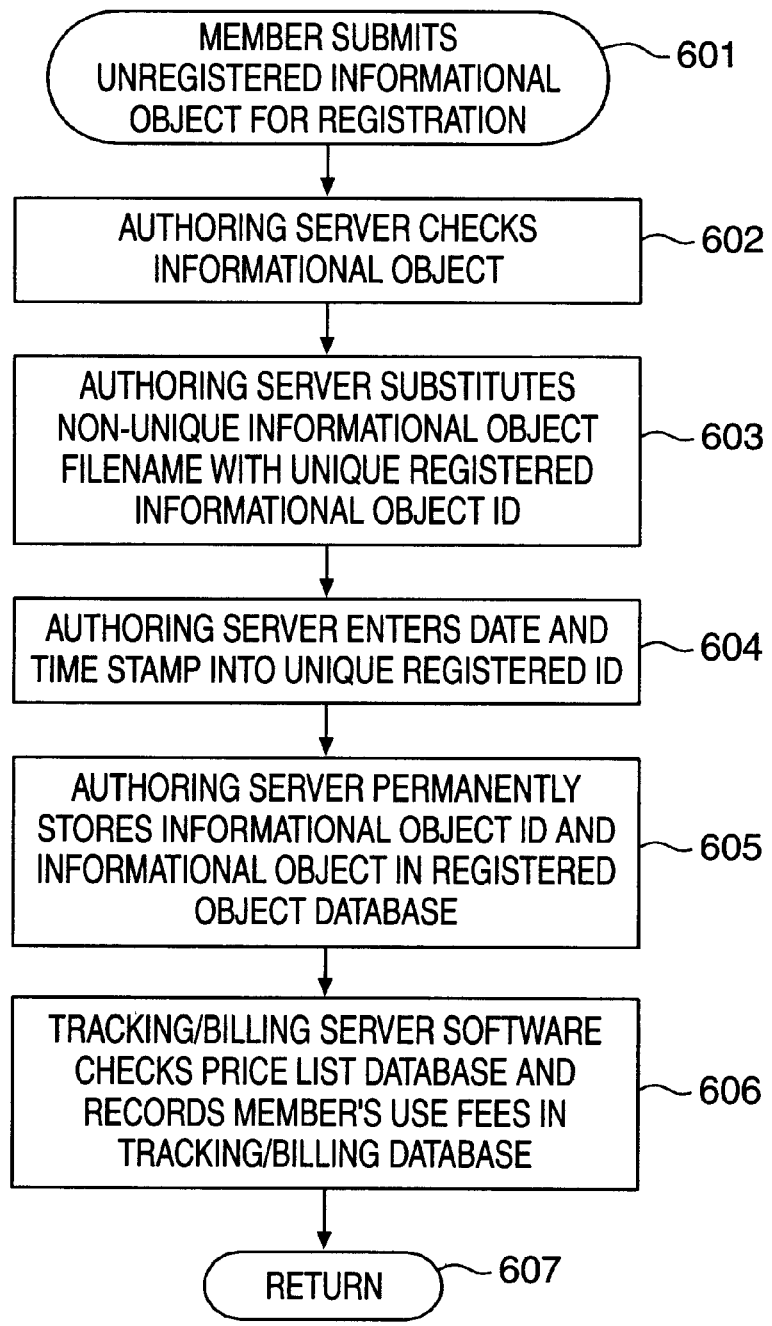
FIG. 6 illustrates in flow diagram form the.operation of the informational object registration process of the present informational object authoring and distribution system.

FIG. 6 illustrates in flow diagram form the operation of the informational object registration process of the present informational object authoring and distribution system 10. At step 601, the unregistered informational object created using the process described with respect to FIG. 5, is submitted to the informational object authoring and distribution system 10 for registration. At step 602, the authoring server 143 checks the unregistered informational object for proper content, format and permissions. If the content and format are proper, at step 603 the authoring server 143 of the informational object authoring and distribution system 10 generates a unique informational object identification and substitutes this for the filename created by the member. At step 604, the authoring server 143 of the informational object authoring and distribution system 10 date and time stamps the informational object to complete the registration process and stores the registered informational object in immutable form in the informational object database 125 at step 605. At step 606, the informational object authoring and distribution system 10 updates the tracking/billing database 127 to debit the member's account for the cost of registering this informational object. This process exits at step 607.

Data Element Permissions Definition Process

Figure 7:
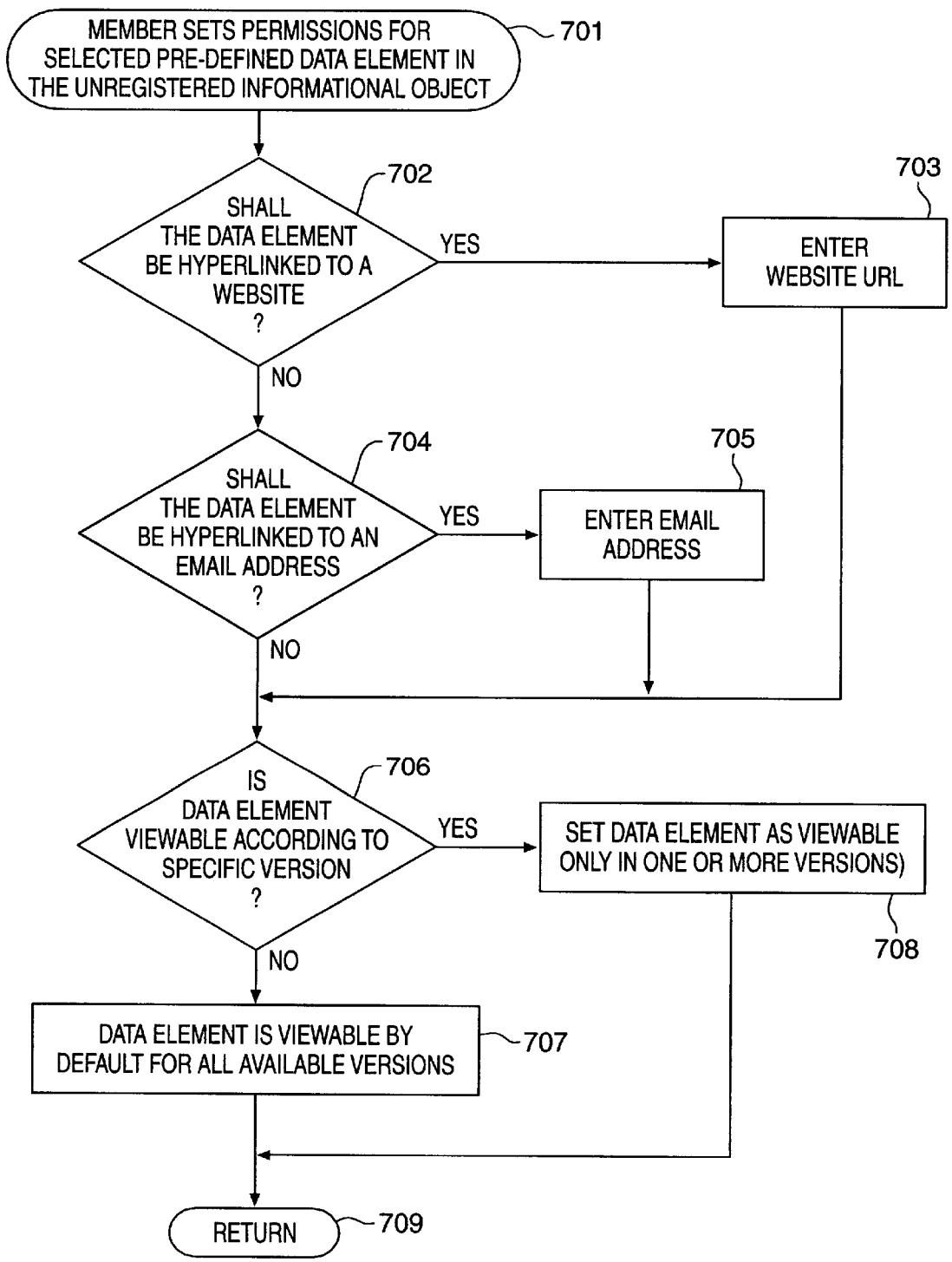
FIG. 7 illustrates in flow diagram form the operation of the data element permissions definition process of the present informational object authoring and distribution system.

FIG. 7 illustrates in flow diagram form the operation of the data element permissions definition process of the present informational object authoring and distribution system 10. In the above-noted description of the informational object creation process of FIG. 5, the member can set permissions for the use of the data elements in the registered informational object. The process illustrated in FIG. 7 details the permissions creation process. In particular, at step 701 the member selects at least one of a plurality of permissions for an identified data element in the unregistered informational object. At step 702, the informational object authoring and distribution system 10 determines whether the member has indicated that this data element shall be hyper-linked to a predefined WEB site. If so, the WEB site URL is entered by the member at step 703 and processing advances to step 706 as described below.

If the member does not link the selected data element to a WEB site, then at step 704 it is determined whether the data element is to be hyper-linked to an e-mail address. If so, at step 705 the member enters the e-mail address data and processing advances to step 706. If no hyper-linking is to be set, then processing also advances to step 706. At step 706, the informational object authoring and distribution system 10 determines whether the data element is viewable according to a specific document version of the data element as defined by the member in step 508. If so, at step 708 the member identifies in which of the defined document versions the data element will be viewable and processing exits at step 709. If no election is made by the member at step 707, then processing advances to step 708 where the default is set that the data element is viewable in all document versions and processing exits at step 709.

Informational Object Permissions Definition Process

Figure 8:
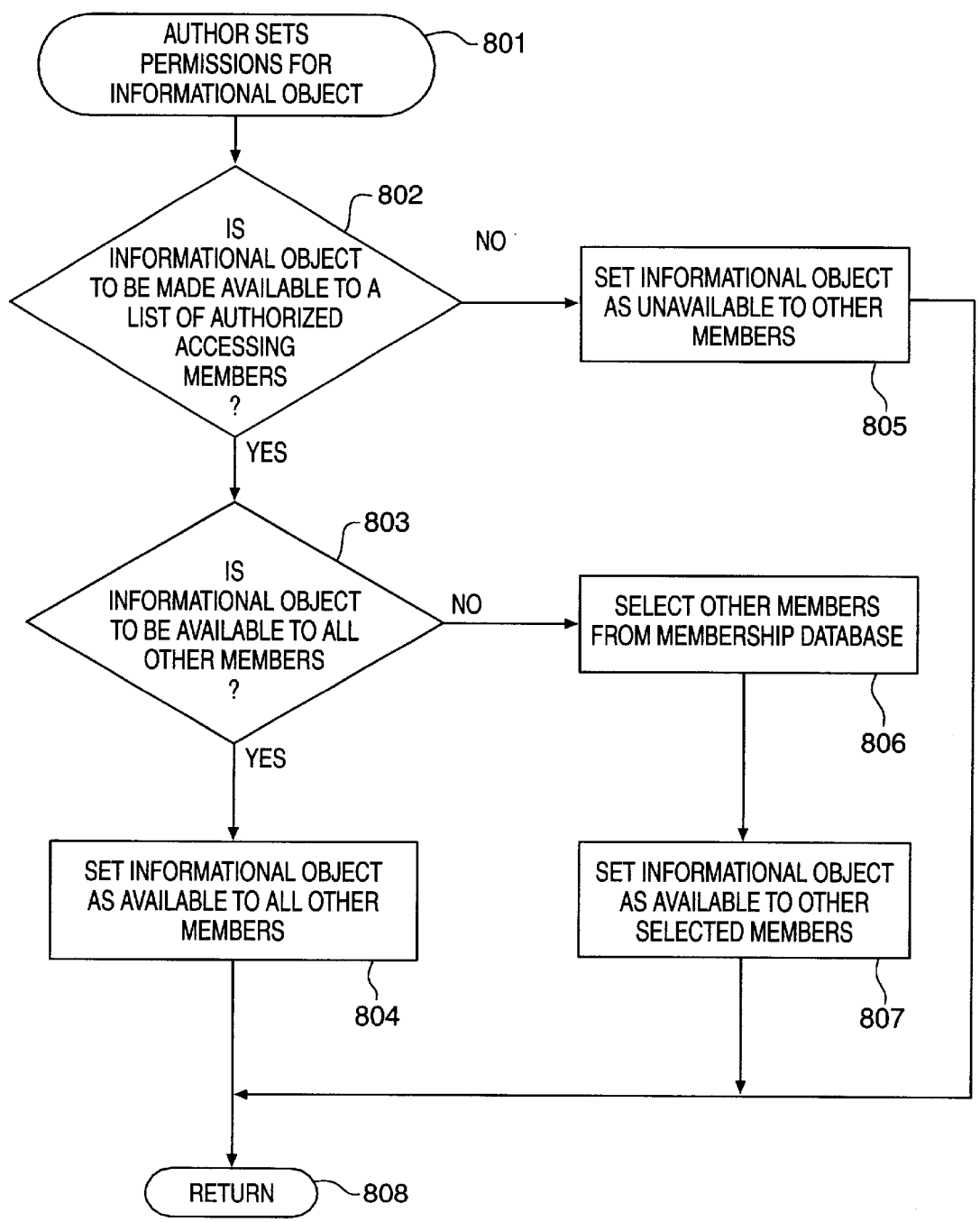
FIG. 8 illustrates in flow diagram form the operation of the informational object access permissions definition process of the present informational object authoring and distribution system.

FIG. 8 illustrates in flow diagram form the operation of the informational object access permissions definition process of the present informational object authoring and distribution system 10. At step 801, the member initiates the process to set access permissions for a selected informational object. At step 802, the member identifies whether any access is permitted. If no other members are permitted to access this informational object, then processing advances to step 805 where the informational object is noted as being unavailable to any other members and processing exits at step 808. If the member notes that some form of access is permitted, at step 803 the member can identify whether a limited set of members drawn only from the Membership Database 123 can access the informational object. If so, processing advances to step 806 where the member identifies, using only the Membership Database 123, the selected other members who are authorized to access this informational object and the informational object authoring and distribution system 10 sets the informational object with this list of authorized accessing members. Processing then exits at step 808. If the member does not limit the access to this informational object, then at step 804 the informational object authoring and distribution system 10 registers at steps 601–607 the informational object with an indicia that all members can access this informational object and processing exits at step 808.

Member Access Process

Figure 9:
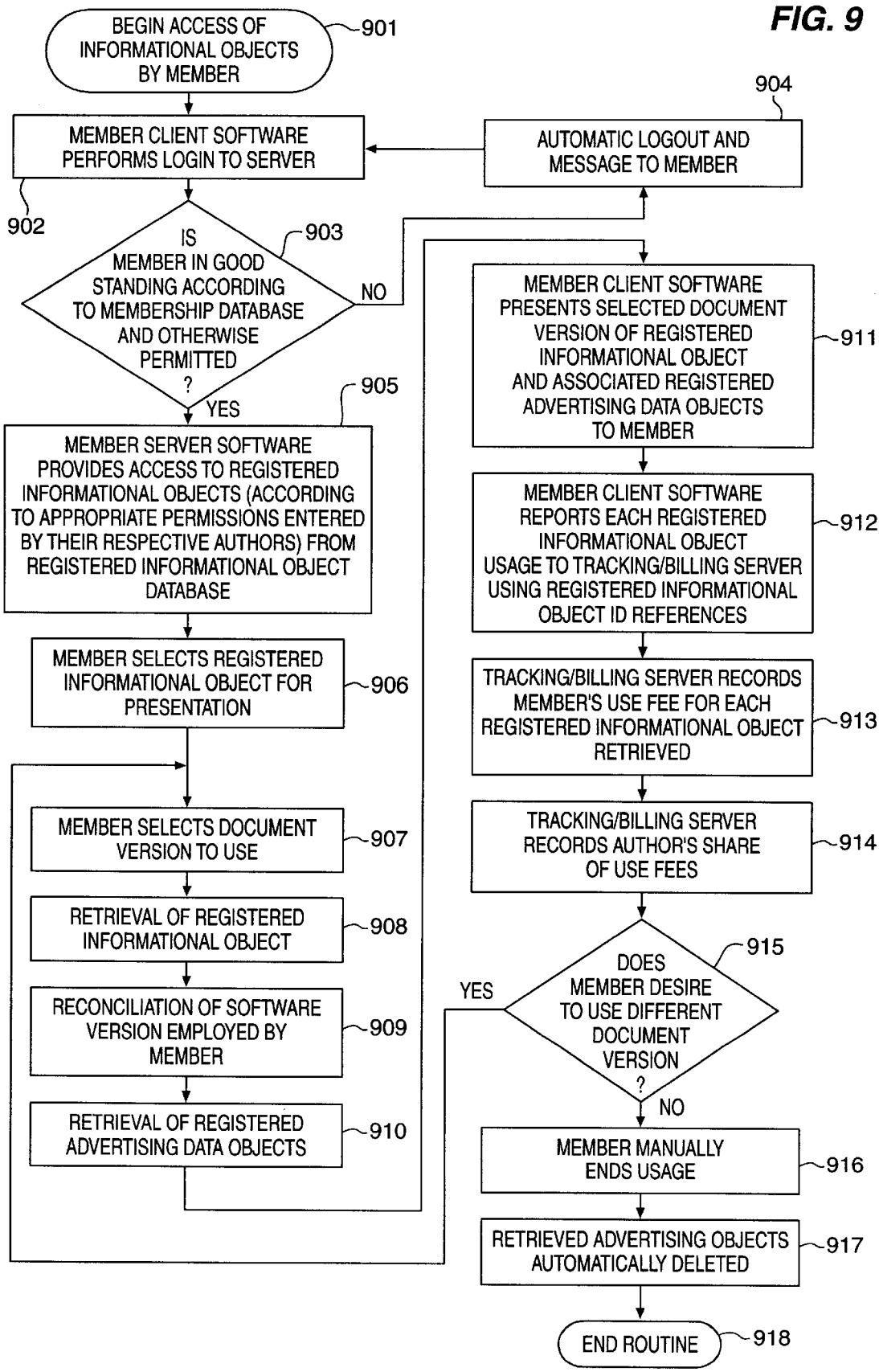
FIG. 9 illustrates in flow diagram form the operation of the member access process of the present informational object authoring and distribution system.

FIG. 9 illustrates in flow diagram form the operation of the member access process of the present informational object authoring and distribution system 10. When a member accesses the informational object authoring and distribution system 10 at step 901 and executes the member access system login process at step 902, the member's identity is checked against an authorized member database 123 by the authentication server 141 at step 903 to ensure that this member is a member in good standing and has the permissions to access the process illustrated in FIG. 9. If not, at step 904, the informational object authoring and distribution system 10 logs out.

If the member is in good standing, the informational object authoring and distribution system 10 advances to step 905 where the member server 144 provides the member with access to the informational object database 125 using the predefined set of permissions for both the member and the informational objects. At step 906, the member selects one of the informational objects for retrieval and the document version of the informational object at step 907. The informational object authoring and distribution system 10 retrieves the selected informational object at step 908 and conforms the software version executing on the member's terminal device T1 with that defined as pertinent to the selected informational object at step 909. At step 910, the member accessing server 144 reviews the advertising permissions associated with the retrieved informational object and retrieves these advertisements for presentation to the member along with the selected informational object at step 911. At step 912, the member access software records the member's access to informational objects and updates the member's entries in the tracking/billing database 127 to debit the member for this informational object retrieval at step 913. At step 914, the tracking/billing server 142 of the informational object authoring and distribution system 10 stores data in the tracking/billing database 127 indicative of the member who authored this informational object and credits that authoring member with an amount indicative of their share of the revenue obtained by this informational object retrieval. At step 915, the informational object authoring and distribution system 10 determines whether the member wishes to view another document version of this informational object and, if so, returns to step 907 as described above. If not, processing advances to step 916 where the member terminates this informational object access session and the advertising data objects are expunged at step 917 and processing completes at step 918.

Advertisement Authoring Process

Figure 10:
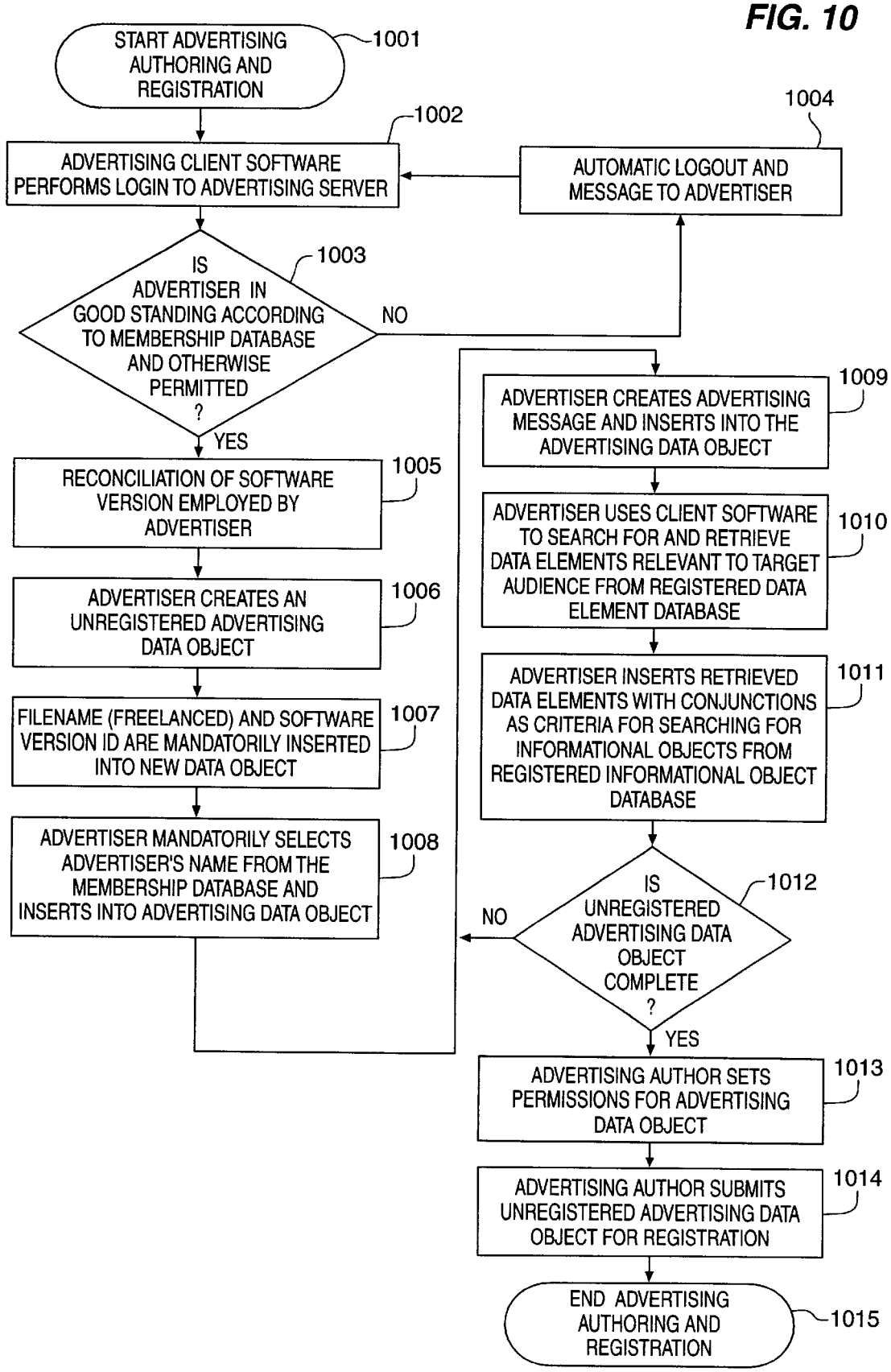
FIG. 10 illustrates in flow diagram form the operation of the advertisement authoring process of the present informational object authoring and distribution system.

FIG. 10 illustrates in flow diagram form the operation of the advertisement authoring process of the present informational object authoring and distribution system 10. When a member accesses the informational object authoring and distribution system 10 at step 1001 and executes the login process at step 1002, the member's identity is checked by the authentication server 144 against an authorized member database 123 at step 1003 to ensure that this member is a member in good standing and has the permissions to access the advertising authoring process illustrated in FIG. 10. If not, at step 1004, the informational object authoring and distribution system 10 logs out.

If the member is in good standing, the informational object authoring and distribution system 10 advances to step 1005 where the advertising server 145 (or alternatively the authoring server 143) of the informational object authoring and distribution system 10 reconciles this member's software version with that presently executing on the informational object authoring and distribution system 10. At step 1006 the member initiates the authoring process for an advertisement by creating an unregistered or draft advertising data object. At step 1007, the advertising server 145 of the informational object authoring and distribution system 10 inserts into the unregistered advertising data object a file name created by the member and a software version used to create the advertising data object. The member at step 1008 must select their name by selecting a data element from the membership database 123 that corresponds to a previously stored data element whose content is the member's name. The advertising server 145 at step 1009 enables the member to create the advertising message and insert this into the unregistered advertising data object. At step 1010, the member searches the data element database 124 to identify various data elements that would be relevant to the unregistered advertising data object and inserts data that identify these data elements into the advertising data object at step 1011. At step 1012, the member determines whether the advertising data object is complete. If not, processing returns to step 1009 and if so, processing advances to step 1013 where the advertising member sets the permissions for this advertising data object. See steps 1305, 1306 and 1307 where permissions set by the member determine whether there is retrieval of the advertising data object at step 1310 or deletion of the advertising association record at step 1312. At step 1014 the member submits the unregistered advertising data object to the informational object authoring and distribution system 10 for registration and the advertising authoring process exits at step 1015.

Advertisement Registration Process

Figure 11:
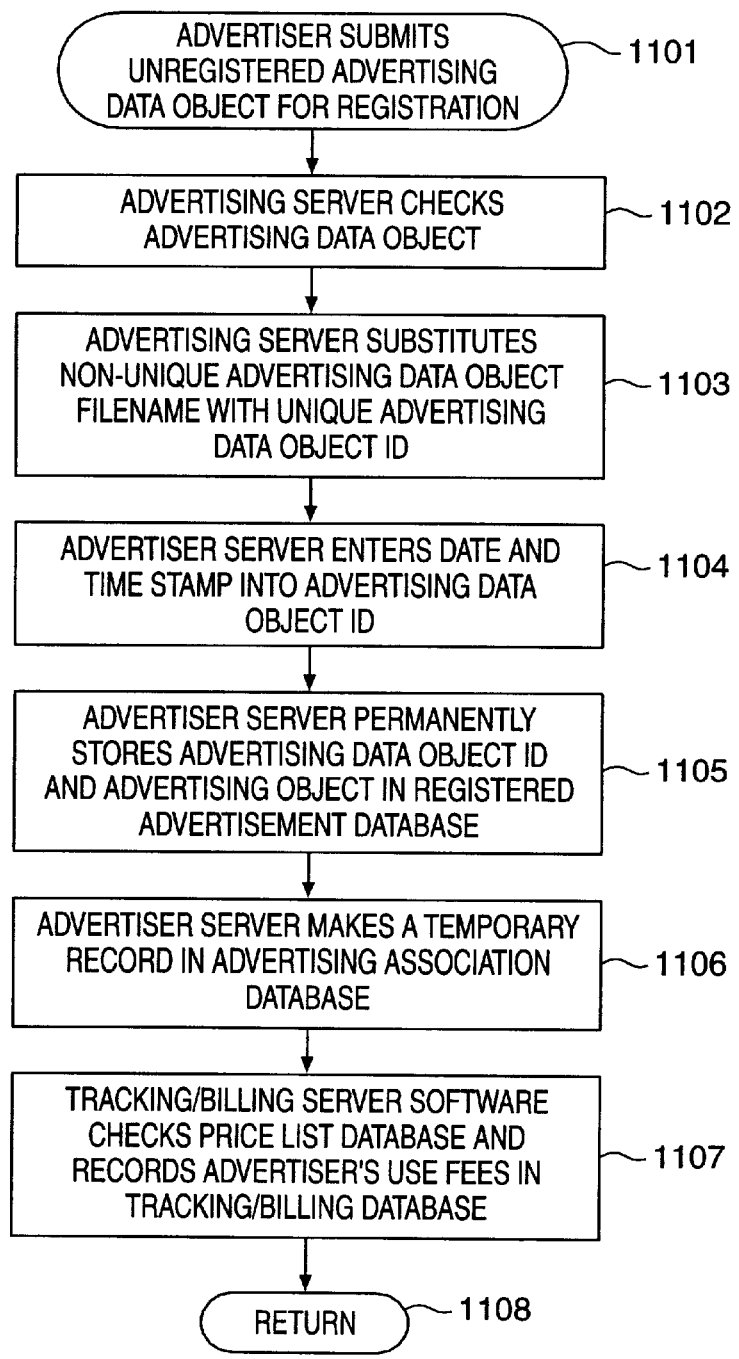
FIG. 11 illustrates in flow diagram form the operation of the advertisement registration process of the present informational object authoring and distribution system.

FIG. 11 illustrates in flow diagram form the operation of the advertisement registration process of the present informational object authoring and distribution system 10. The unregistered advertising data object created via the process defined in FIG. 10 is processed for registration using the process of FIG. 11. In particular, at step 1101, the unregistered advertising data object is submitted to the informational object authoring and distribution system 10 for registration and at step 1102 the advertising server 145 checks the unregistered advertising data object for proper content, format and permissions. If the content and format are proper, at step 1103 the advertising server 145 of the informational object authoring and distribution system 10 generates a unique advertising data object identification and substitutes this for the filename created by the member. At step 1104, the advertising server 145 of the informational object authoring and distribution system 10 date and time stamps the advertising data object. At step 1105, the advertising server 145 stores the unique advertising data object identification inserted at step 1103, the date and time stamp inserted at step 1104, the search criteria inserted at step 1011, the advertising message inserted at step 1009, and the permissions inserted at step 1013 in an immutable form in the registered advertisement database 126. At step 1106 the advertising server 145 produces a record of the advertising data object in the advertising association database 128. At step 1107, the informational object authoring and distribution system 10 updates the tracking/billing database 127 to debit the member's account for the cost of registering this advertising data object. This process exits at step 1108 to return to the process defined in FIG. 10.

Advertising Access Record Process

Figure 12:
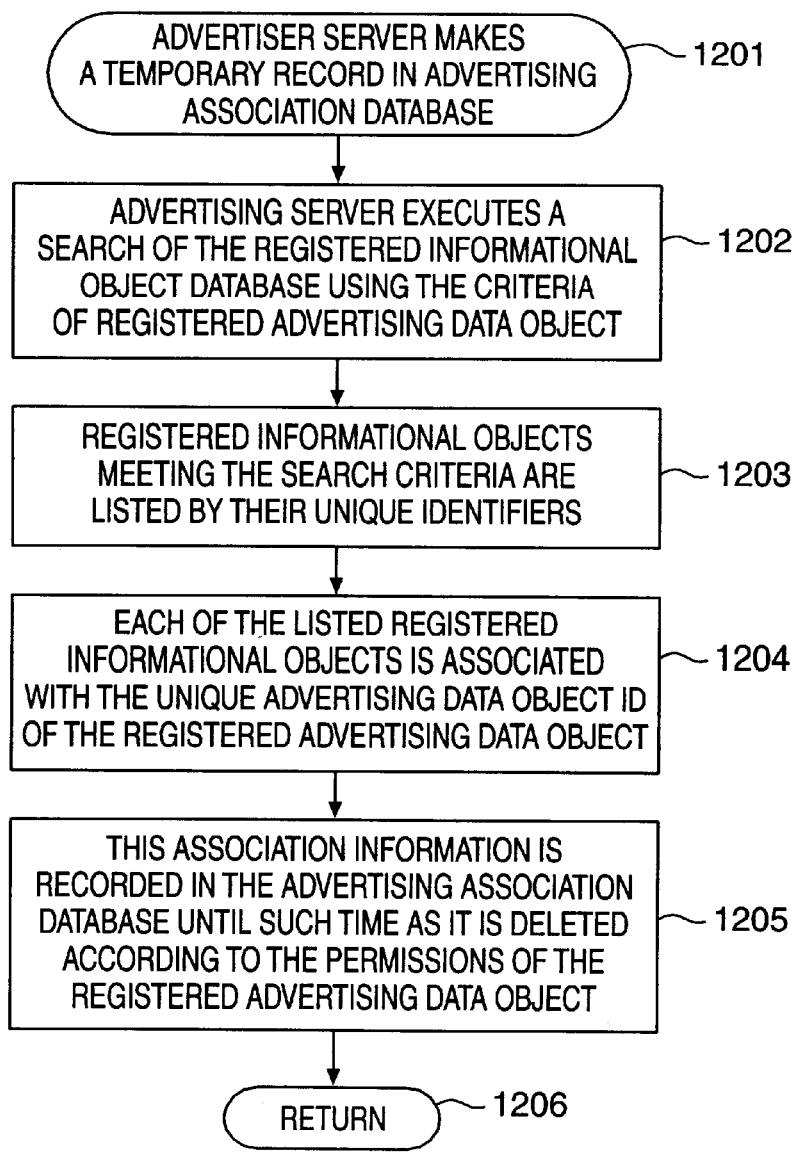
FIG. 12 illustrates in flow diagram form the operation of the advertising access record process of the present informational object authoring and distribution system.

FIG. 12 illustrates in flow diagram form the operation of the advertising access record process of the present informational object authoring and distribution system. This process is initiated at step 1201 from the step 1106 noted above. At step 1202, the advertising server 145 executes a search of the Registered Informational Object database 125 using the search criteria entered at step 1011 for the Advertising Data Object registered at step 1105. At step 1203, the Registered Informational Objects matching the search criteria entered at step 1011 are organized and listed by their unique identifiers. At step 1204, each of the matching unique identifiers of step 1203 is associated with the unique serial identifier of the Advertising data object registered at step 1105. At step 1205 the associated information of step 1204 is recorded in the Advertising Association database 128 for speeding up the processing at steps 1303, 1304,1305,1306 and 1307 pending termination of the effect of the Registered Advertising Data Object as determined by the permissions entered at step 1013. Upon completing step 1205, or in the event no Registered Informational Object matches the criteria of Registered Advertising Data Object in step 1202, then step 1106 is deemed to be completed and there is a return from step 1206 to step 1107.

Registered Advertisement Retrieval Process

Figure 13:
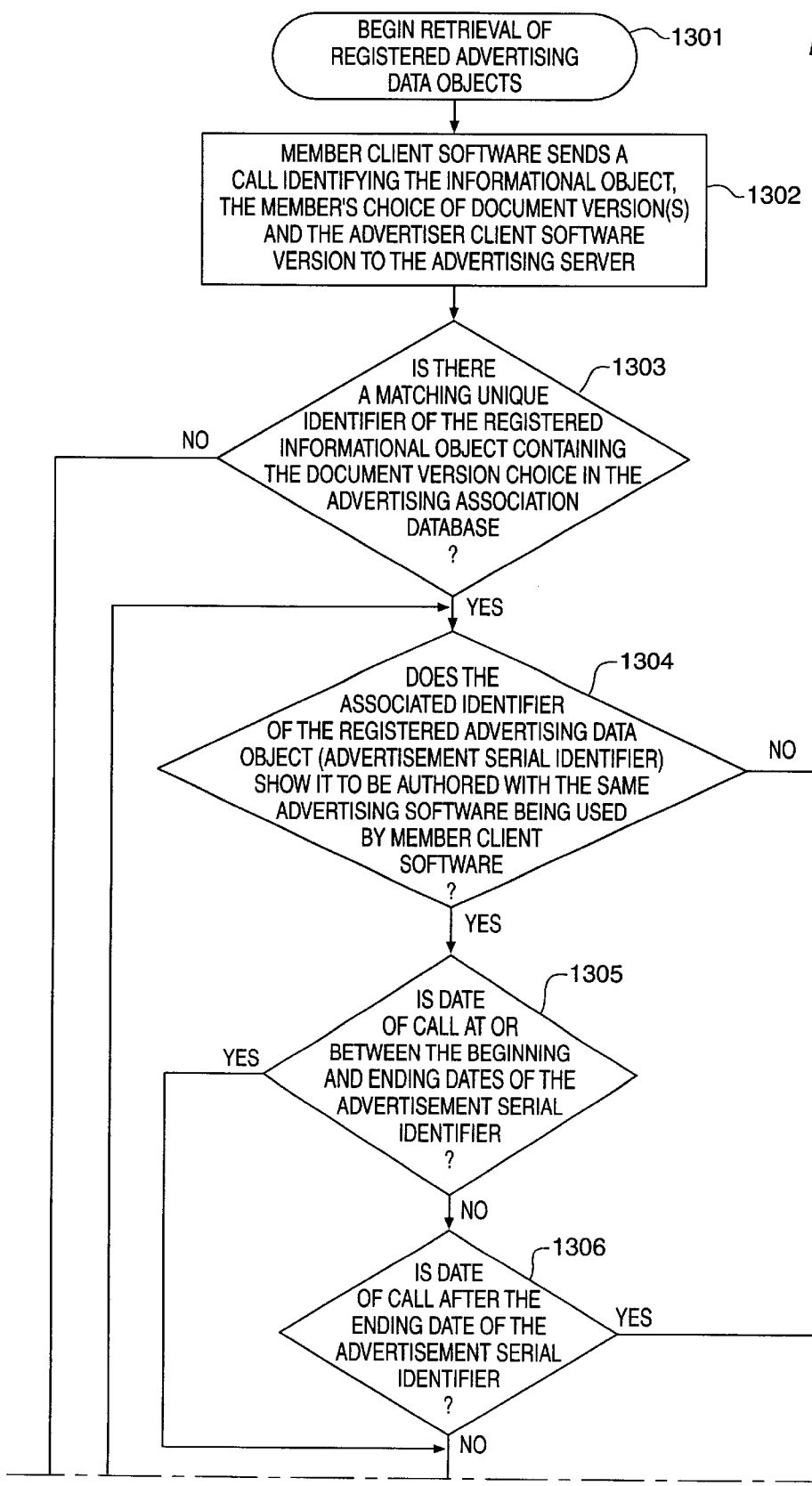
FIGS. 13 and 14 illustrate in flow diagram form the operation of the registered advertisement retrieval process of the present informational object authoring and distribution system.
Figure 14:
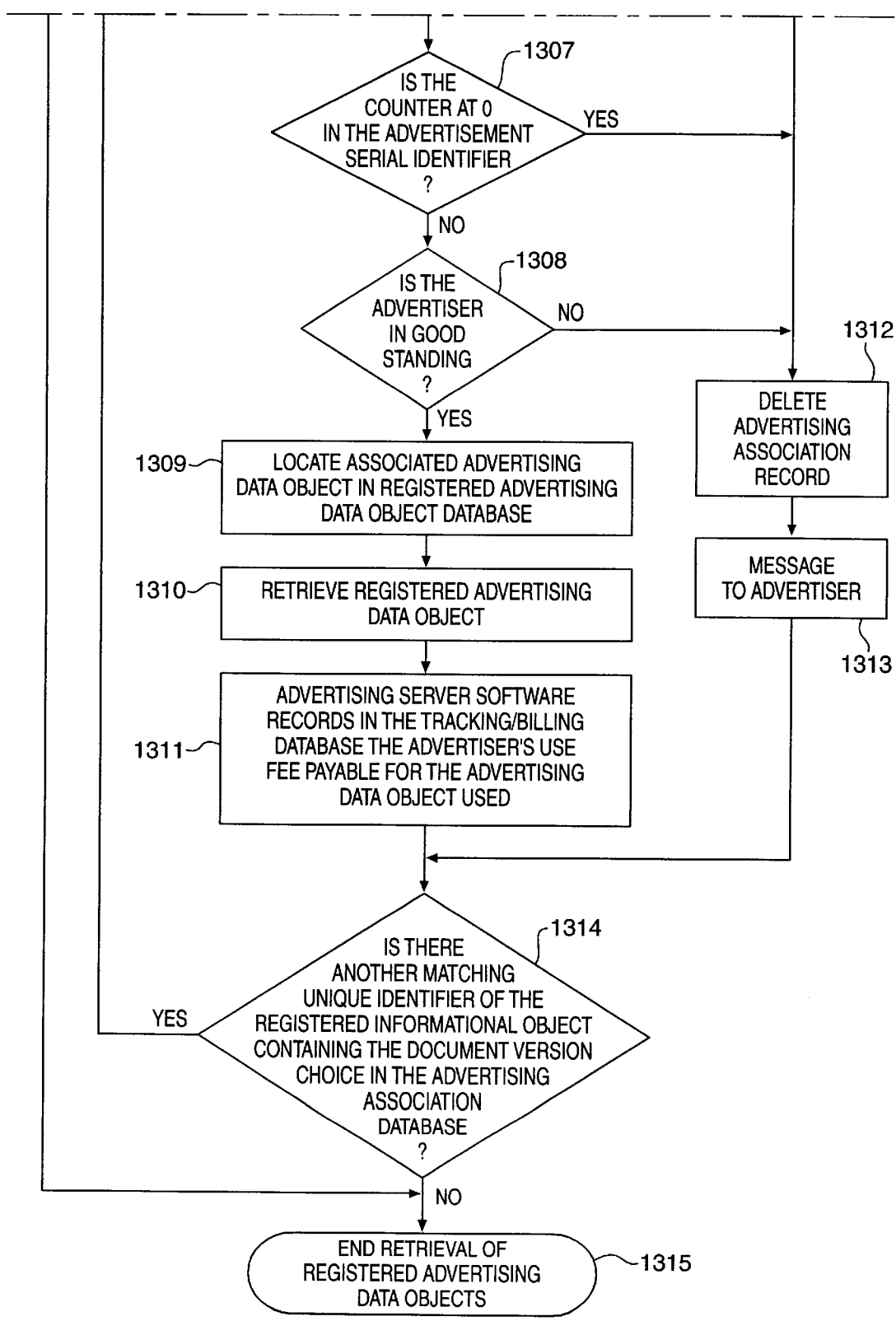

FIG. 13 illustrates in flow diagram form the operation of the registered advertisement retrieval process of the present informational object authoring and distribution system 10. When a member retrieves an informational object, registered advertising data objects may be retrieved at step 910 as described above. This retrieval process is initiated at step 1301 and at step 1302 the member's client software transmits data to the informational object authoring and distribution system 10 to identify the selected informational object, the format of the informational object to be retrieved, and the advertising client software. The advertising server at step 1303 determines whether there is a unique informational object identifier in the advertising association database 128 that matches the informational object selected by the member. If not, processing exits at step 1315.

If the advertising server 145 detects a match between an informational object selected by the member and a record in the advertising association database 128, then at step 1304 the software compatibility between the advertising client executing on the member's terminal device and that defined for the identified advertisement is checked and if an incompatibility is detected, at step 1312 the advertising server 145 deletes the record of the advertising association and notifies the advertiser at step 1313 of the record deletion. At step 1314 the advertising server 145 determines whether other matches have occurred and if not processing exits at step 1315. If another match occurs processing returns to step 1304. If there is a compatibility of software determined at step 1304, the advertising server at steps 1305–1307 determines whether the advertisement has expired according to the permissions entered at step 1013. If not, processing advances to step 1308 where the advertiser is identified and their standing is determined. If the advertiser is not in good standing or the advertisement has expired, processing advances to step 1312 as noted above. Otherwise, processing advances to step 1309 where the identified advertising data object is located in the advertising database 126 and retrieved at step 1310 for presentation to the member at step 911. At step 1311 the advertising server 145 updates the tracking/billing database 127 to note the fee due for the use of the advertisement. Processing then proceeds to step 1314 as described above.

Summary

The informational object authoring and distribution system automates the authoring, maintenance and distribution of informational objects and the associated data elements. In addition, the informational object authoring and distribution system can provide value-added services by facilitating the interconnection of the product manufacturers and their members with other vendors who provide related services.

What is claimed:

1. An information authoring and distribution system for generating information objects, each of which contains a set of immutable data, comprising:

first means for maintaining in a read-only mode, a plurality of immutable data elements, each of which is identified by a unique identifier;

second means for maintaining in a read-only mode, a set of data that defines an informational object, said set of data comprising a plurality of said unique identifiers that correspond to a selected set of said plurality of data elements;

means for enabling an authorized authoring member to create data comprising at least one of a draft data element and a draft informational object;

means for authenticating said at least one of a draft data element and a draft informational object created by said authorized authoring member;

means for converting said authenticated at least one of a draft data element and a draft informational object created by said authorized authoring member to a corresponding immutable at least one of a data element and an informational object;

means for writing said created immutable at least one of a data element and an informational object into a memory for use by said first and said second means for maintaining.

2. The information authoring and distribution system of claim 1 further comprising:

means for enabling an authorized accessing member to retrieve a selected informational object and its associated data elements.

3. The information authoring and distribution system of claim 1 wherein said authorized authoring member creates a data element, said means for converting comprises:

means for assigning a unique identifier to said created data element.

4. The information authoring and distribution system of claim 1 wherein said authorized authoring member creates an informational object, said means for converting comprises:

means for assigning a unique identifier to said created informational object.

5. The information authoring and distribution system of claim 1 wherein said authorized authoring member creates an informational object, said means for converting further comprises:

means for associating said unique identifier assigned to said created informational object with said unique identifiers that correspond to a selected set of said plurality of data elements.

6. The information authoring and distribution system of claim 1 wherein said first and said second means for maintaining comprises:

processor means and associated memory means accessible via a data communication connection for storing a plurality of said data elements and said informational objects.

7. The information authoring and distribution system of claim 6 wherein said means for enabling comprises:

means, executing on said processor means, for enabling selected members to create said data elements and informational objects for storage in said memory means.

8. The information authoring and distribution system of claim 1 wherein said means for authenticating comprises:

means for comparing content of at least one of said draft data element and said informational object with a set of predetermined rules; and means, responsive to said content satisfying said rules, for registering said at least one of said draft data element and said informational object.

9. The information authoring and distribution system of claim 1 wherein said means for converting further comprises:

means for updating an informational object by creating a new informational object relating back to said informational object and containing at least one new data element.

10. The information authoring and distribution system of claim 1 further comprising:

means, responsive to access of an informational object by said authorized accessing member, for providing said authorized accessing member with data representative of an ancillary one of a product and a service relating to said accessed informational data object.

11. The information authoring and distribution system of claim 10 further comprising:

means for enabling an authorized advertising member to create a draft advertising data object comprising one or more of said plurality of immutable data elements;

means for authenticating said draft advertising data object created by said authorized advertising member; and means for converting said authenticated advertising data object created by said authorized advertising member to a corresponding immutable advertising data object maintained in a read-only mode.

12. A method for generating information objects, each of which contains a set of immutable data, comprising the steps of:

maintaining in a read-only mode, a plurality of immutable data elements, each of which is identified by a unique identifier;

maintaining in a read-only mode, a set of data that defines an informational object, said set of data comprising a plurality of said unique identifiers that correspond to a selected set of said plurality of data elements;

enabling an authorized authoring member to create data comprising at least one of a draft data element and a draft informational object;

authenticating said at least one of a draft data element and a draft informational object created by said authorized authoring member;

converting said authenticated at least one of a draft data element and a draft informational object created by said authorized authoring member to a corresponding immutable at least one of a data element and an informational object;

writing said created immutable at least one of a data element and an informational object into a memory for use by said first and said second means for maintaining.

13. The method of claim 12 further comprising the step of:

enabling an authorized accessing member to retrieve a selected informational object and its associated data elements.

14. The method of claim 12 wherein said authorized authoring member creates a data element, said step of converting comprises:

assigning a unique identifier to said created data element.

15. The method of claim 12 wherein said authorized authoring member creates an informational object, said step of converting comprises:

assigning a unique identifier to said created informational object.

16. The method of claim 12 wherein said authorized authoring member creates an informational object, said step of converting further comprises:

associating said unique identifier assigned to said created informational object with said unique identifiers that correspond to a selected set of said plurality of data elements.

17. The method of claim 12 wherein said steps of maintaining comprise:

operating a processor and associated memory, that are accessible via a data communication connection, to store a plurality of said data elements and said informational objects.

18. The method of claim 17 wherein said step of enabling comprises:

executing on said processor authoring software to enable selected members to create said data elements and informational objects for storage in said memory.

19. The method of claim 12 wherein said step of authenticating comprises:

comparing content of at least one of said draft data element and said informational object with a set of predetermined rules; and registering, in response to said content satisfying said rules, said at least one of said draft data element and said informational object.

20. The method of claim 12 wherein said step of converting further comprises:
updating an informational object by creating a new informational object relating back to said informational object and containing at least one new data element.

21. The method of claim 12 further comprising:
providing, in response to access of an informational object by said authorized accessing member, said authorized accessing member with data representative of an ancillary one of a product and a service relating to said accessed informational data object.

22. The method of claim 21 further comprising the step of:
enabling an authorized advertising member to create a draft advertising data object comprising one or more of said plurality of immutable data elements;
authenticating said draft advertising data object created by said authorized advertising member; and
converting said authenticated advertising data object created by said authorized advertising member to a corresponding immutable advertising data object maintained in a read-only mode.

23. An information authoring and distribution system for generating information objects, each of which contains a set of immutable data, comprising:
data element database means for maintaining in a read-only mode, a plurality of immutable data elements, each of which is identified by a unique identifier;
informational object database means for maintaining in a read-only mode, a set of data that defines an informational object, said set of data comprising a plurality of said unique identifiers that correspond to a selected set of said plurality of data elements;
authoring client server means for enabling an authorized authoring member to create data comprising at least one of a draft data element and a draft informational object;
authoring server means for converting said at least one of a draft data element and a draft informational object created by said authorized authoring member to a corresponding at least one of a data element and an informational object;
database management means for writing said created at least one of a data element and an informational object into a corresponding one of said data element database means and said informational object database means.

24. The information authoring and distribution system of claim 23 further comprising:
member client server means for enabling an authorized accessing member to retrieve a selected informational object and its associated data elements.

25. The information authoring and distribution system of claim 23 wherein said authorized authoring member creates a data element, said authoring server means comprises:
data element registering means for assigning a unique identifier to said created data element.

26. The information authoring and distribution system of claim 23 wherein said authorized authoring member creates an informational object, said authoring server means comprises:
informational object registering means for assigning a unique identifier to said created informational object.

27. The information authoring and distribution system of claim 23 wherein said authorized authoring member creates an informational object, said authoring server means further comprises:
mapping means for associating said unique identifier assigned to said created informational object with said unique identifiers that correspond to a selected set of said plurality of data elements.

28. The information authoring and distribution system of claim 23 wherein said data element database means and said informational object database means comprise:
processor means and associated memory means accessible via a data communication connection for storing a plurality of said data elements and said informational objects.

29. The information authoring and distribution system of claim 28 wherein said authoring client server means comprises:
authoring software means, executing on said processor means, for enabling selected members to create said data elements and informational objects for storage in said memory means.

30. The information authoring and distribution system of claim 23 wherein said authoring server means comprises:
content conforming means for comparing content of at least one of said draft data element and said informational object with a set of predetermined rules; and
conversion means, responsive to said content satisfying said rules, for registering said at least one of said draft data element and said informational object.

31. The information authoring and distribution system of claim 23 wherein said authoring server means further comprises:
version management means for updating an informational object by creating a new informational object relating back to said informational object and containing at least one new data element.

32. The information authoring and distribution system of claim 23 further comprising:
advertising server means, responsive to access of an informational object by said authorized accessing member, for providing said authorized accessing member with data representative of an ancillary data object one of either or both a product and a service relating to said accessed informational data object.

33. The information authoring and distribution system of claim 32 further comprising:
means for enabling an authorized advertising member to create a draft advertising data object comprising one or more of said plurality of immutable data elements;
means for authenticating said draft advertising data object created by said authorized advertising member; and
means for converting said authenticated advertising data object created by said authorized advertising member to a corresponding immutable advertising data object maintained in a read-only mode.

* * * * *